March 31, 1964     E. J. BOLCHALK     3,127,047

MOUNTING CLAMP FOR CEILING OUTLET BOXES

Filed Sept. 1, 1961

INVENTOR.
EDWARD J. BOLCHALK

BY

ATTORNEY

United States Patent Office 3,127,047
Patented Mar. 31, 1964

3,127,047
MOUNTING CLAMP FOR CEILING
OUTLET BOXES
Edward J. Bolchalk, 530 Homewood Ave., Hubbard, Ohio, assignor of one-half to Daniel G. Williams, Hubbard, Ohio
Filed Sept. 1, 1961, Ser. No. 135,610
2 Claims. (Cl. 220—3.6)

This invention relates to electrical outlet boxes and more particularly to novel clamps for mounting such boxes in finished ceilings.

The principal object of the invention is the provision of a mounting clamp for a ceiling outlet box.

A further object of the invention is the provision of a simple and inexpensive mounting clamp for a ceiling outlet box.

A still further object of the invention is the provision of a mounting clamp for a ceiling outlet box that may be inexpensively made quickly installed and easily manipulated to hold a ceiling outlet box in position in an opening in the ceiling.

The mounting clamp for a ceiling outlet box as disclosed herein comprises an improvement in the art relating to such devices in that a simple and inexpensive clamp is disclosed which may be quickly attached to an outlet box, placed in an opening in a finished ceiling and manipulated to alter its shape and position and size so as to hold said outlet box firmly in said opening. Many devices have heretofore been proposed for mounting electrical outlet boxes in walls and such generally termed old work boxes have included a number of devices which attempt to position a member or members on the front and back surfaces of the wall in which the outlet box is being mounted. Such devices are generally not applicable to a ceiling outlet box and the present invention therefore fills the need and at the same time provides a device which is highly effective.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
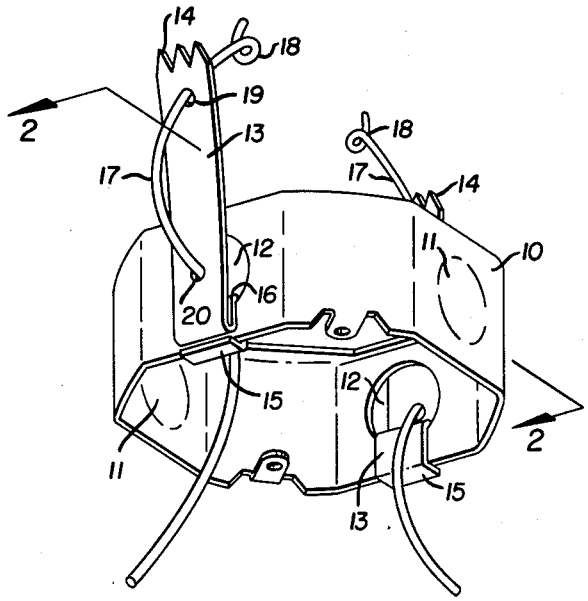
FIGURE 1 is a perspective view of a ceiling outlet box with two of the mounting clamps in position thereon.
Figure 2:
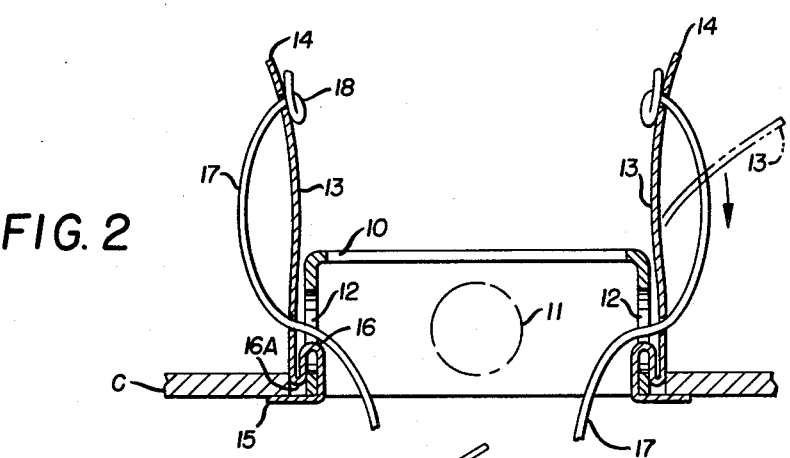
FIGURE 2 is a vertical section on line 2—2 of FIGURE 1.
Figure 3:
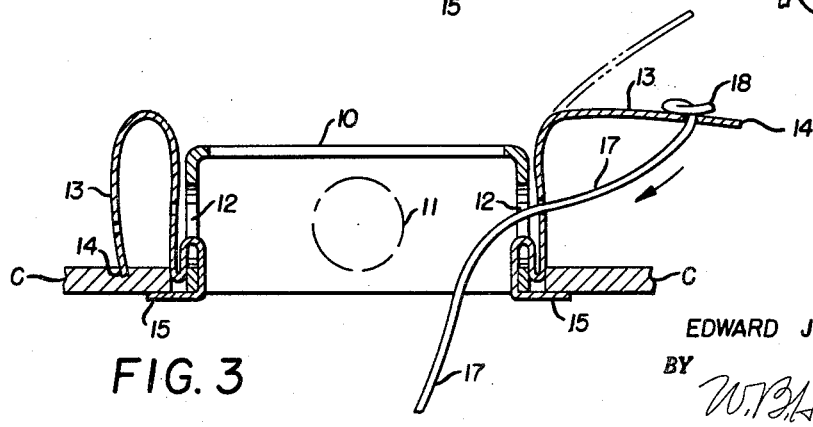
FIGURE 3 is a vertical section similar to FIGURE 2 showing the clamping members in different positions.

By referring to the drawings and FIGURE 1 in particular, it will be seen that a ceiling outlet box 10 is shown in the position it occupies when positioned in an opening in a finished ceiling. It will be seen that the box is provided with a plurality of knock-out portions 11, 11 and that an oppositely disposed pair of the same have been removed to provide a pair of oppositely disposed openings 12, 12. A pair of mounting clamps are shown in position one in each of the openings 12, 12. Each of the mounting clamps comprises an elongated body member 13 of suitable material such as strip steel like that used for banding various articles together and having one of its end serrated to form a plurality of teeth 14 and its other end flanged at right angles as at 15. Adjacent the right angled flange 15 there is a reversed bend in the member 13 which is formed by bending the body member 13 first in one direction and then in the other direction at a point adjacent the first bend. As best seen in FIGURE 2 of the drawings the first bend is indicated at 16 and the second bend at 16A and it will be observed that when the bend 16 is partially completed the device may be readily positioned through the opening 12 and the bend 16 completed so that the flange 15 is disposed at right angles to the majority of the body member 13. A section of wire or other flexible material 17 is secured as by a loop 18 in an opening 19 near the serrated end of the body member 13 and the wire extends through a second opening 20 adjacent the bend 16 in the body member 13 and into the area within the outlet box 10 where it may be grasped with a pair of pliers or other tool and pulled downwardly while the box 10 is held in the opening in the ceiling as seen in FIGURES 2 and 3 wherein the ceiling is indicated by the letter C. In the right hand side of FIGURE 2 broken lines illustrate the initial action or motion of the body member 13 with an arrow indicating the direction of movement. In FIGURE 3 and at the righthand side thereof the next progressive positioning of the body member 13 may be seen as occasioned by further movement of the wire 17 and in the lefthand side of FIGURE 3 the final positioning of the clamp may be seen wherein the body member 13 is in the position of an inverted U with the serrated end defining the teeth 14 embedded in the material of the ceiling C. The wire 17 has been pushed backwardly through the device which is now holding the outlet box in position in the ceiling opening. It will be seen that the flange 15 is of a length sufficient to underlie the edge of the ceiling C while the serrated end of the body member 13 forming the teeth 14 forceably engages the opposite or upper side of the ceiling. It will be seen that the mounting clamp itself comprises a section of steel strip which may be inexpensively formed from a continuous length thereof and which requires rather simple forming tools. It will also be seen that when it is secured to the outlet box as shown in the several figures of the drawings it will remain securely attached thereto and ready for use as hereinbefore described. It will also be seen that when it is employed for holding the ceiling outlet box in an opening in a ceiling the thickness of the ceiling and the material from which it is formed is immaterial for successful functioning of the mounting clamp. A further advantage in the mounting clamp disclosed herein is its inherent resiliency which insures the retention of the ceiling outlet box in firm relation to the ceiling in which it is mounted.

It will thus be seen that a mounting clamp for an outlet box has been disclosed which meets the several objects of the invention and having thus described my invention, what I claim is:

1. A mounting clamp and ceiling outlet box comprising in combination a box having an open bottom and vertical sides, said sides having removable sections to form openings therein and said clamp comprising a narrow section of strip steel positioned vertically alongside one side of said box, and having a flattened loop therein with said loop extending through one of said openings with the lower end of said section of strip steel positioned adjacent said bottom of said box, an outturned flange on said lower end and a wire secured to the upper end of said section of strip steel and extending downward and through an opening in said section of strip steel and through said opening with said loop.

2. A mounting clamp for a ceiling outlet box comprising a longitudinal section of resilient strip material having a right angular flange at one end and a pair of oppositely disposed bent areas adjacent one another inwardly from said flange, said oppositely disposed bent areas acting to position one portion of said strip material in offset relation to the other, a flexible wire engaged through an opening in said strip material and secured to said strip material member near its other end, said other end being serrated, said flexible wire arranged to move said serrated end toward said flanged end.

References Cited in the file of this patent
UNITED STATES PATENTS

| | | |
|---|---|---|
| 2,309,189 | Hancock et al. | Jan. 26, 1943 |
| 2,581,755 | Dieffenderfer | Jan. 8, 1952 |
| 2,762,591 | Weber | Sept. 11, 1956 |